United States Patent
Carter

(10) Patent No.: US 9,841,741 B2
(45) Date of Patent: Dec. 12, 2017

(54) METHOD AND APPARATUS TO REPLACE AN ELECTRICAL POWER MODULE IN A WIRELESS VALVE POSITIONER WITHOUT POWER DISRUPTION

(71) Applicant: FISHER CONTROLS INTERNATIONAL LLC, Marshalltown, IA (US)

(72) Inventor: Perry K. Carter, Ames, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 265 days.

(21) Appl. No.: 14/488,779

(22) Filed: Sep. 17, 2014

(65) Prior Publication Data

US 2016/0077503 A1    Mar. 17, 2016

(51) Int. Cl.
| | |
|---|---|
| G05B 15/00 | (2006.01) |
| G05B 15/02 | (2006.01) |
| G05F 1/66 | (2006.01) |
| G05B 19/042 | (2006.01) |
| G06F 1/30 | (2006.01) |

(52) U.S. Cl.
CPC ............ *G05B 15/02* (2013.01); *G05B 19/042* (2013.01); *G05F 1/66* (2013.01); *G06F 1/30* (2013.01); *G05B 2219/33192* (2013.01); *G05B 2219/34073* (2013.01); *G05B 2219/34445* (2013.01)

(58) Field of Classification Search
CPC .............. G05F 1/66; G05F 1/263; G05F 1/30
See application file for complete search history.

(56) References Cited

U.S. PATENT DOCUMENTS

| | | | |
|---|---|---|---|
| 8,118,542 B2* | 2/2012 | Damgaard | F03D 1/001 415/123 |
| 2012/0169453 A1* | 7/2012 | Bryla | E05B 47/00 340/3.1 |
| 2012/0265004 A1* | 10/2012 | Kaushansky | A61M 1/1072 600/18 |
| 2013/0179697 A1* | 7/2013 | Nicholas | G06F 1/30 713/300 |

OTHER PUBLICATIONS

Written Opinion issued in Application No. PCT/US2015/050566 dated Dec. 10, 2015.

* cited by examiner

*Primary Examiner* — Bryce Bonzo
*Assistant Examiner* — Katherine Lin
(74) *Attorney, Agent, or Firm* — Marshall, Gerstein & Borun LLP

(57) ABSTRACT

A process control device includes an interface configured to communicate with other devices in a process control system. The process control device also includes a primary power source, the primary power source configured to provide power to at least one component of the process control device, which component, if not powered, would result in disruption to the control of the process. The process control device still further includes a terminal configured to electrically couple the process control device to an auxiliary power source such that the auxiliary power source provides sufficient power to the at least one component when the auxiliary power source is connected to the terminal such that the process control device remains operable to control the process in the absence of the primary power source.

31 Claims, 9 Drawing Sheets

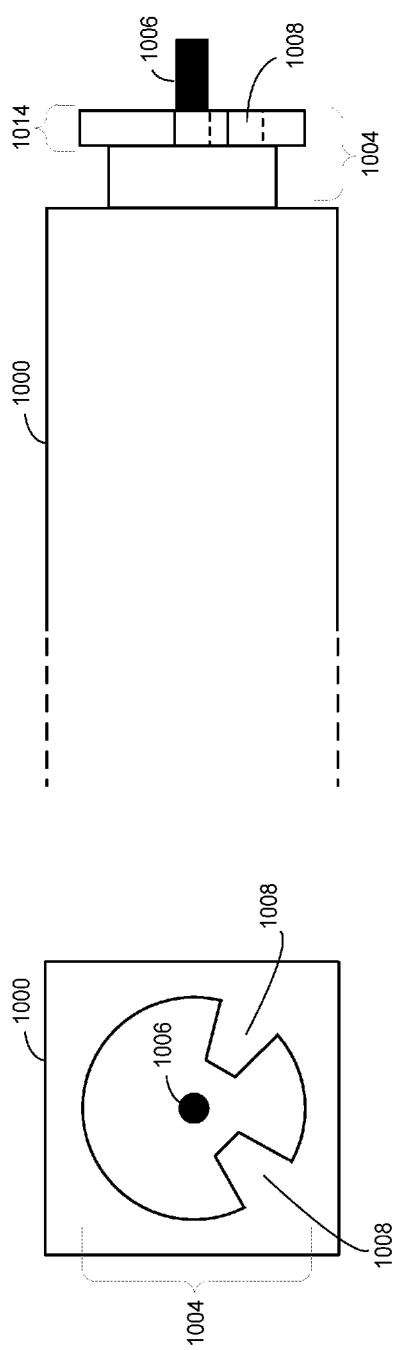
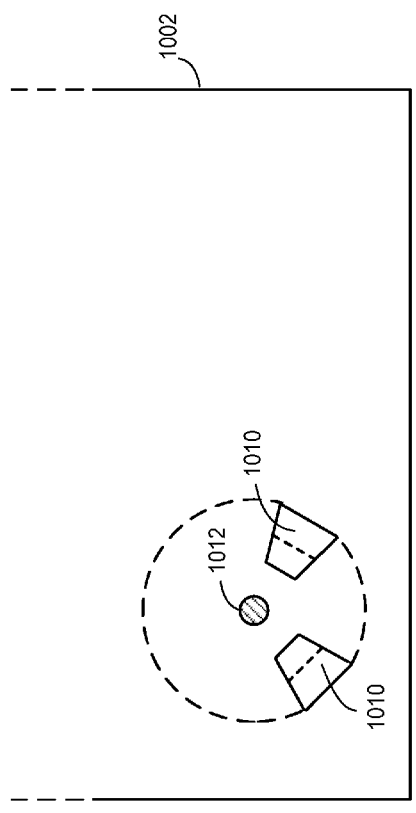
FIG. 10A
FIG. 10B
FIG. 10C

METHOD AND APPARATUS TO REPLACE AN ELECTRICAL POWER MODULE IN A WIRELESS VALVE POSITIONER WITHOUT POWER DISRUPTION

FIELD OF THE DISCLOSURE

The present disclosure is directed to a method for replacing power sources in process control devices and, more particularly, to a method and apparatus for replacing power sources in wireless process control devices without interrupting the operation of the wireless process control devices.

BACKGROUND

Wireless process control devices, such as wireless valve positioners, can facilitate control of valves and other equipment in hard-to-reach places or where a wired solution is not cost-effective or practical. However, the process control industry has been slow to adopt such wireless process control devices due to concerns related to the lifetime of batteries that power the wireless process control devices. If a battery powering a valve positioner is drained of power, the valve controlled by the positioner will go into a fail safe mode and will cease to be controlled.

Although improved battery technology may increase the lifetime of batteries, the fact remains that power sources powering wireless process control devices need to be replaced at certain times during the operation of the wireless process control devices. Even if such a replacement occurs before a battery runs out of power, the replacement of one battery with another battery still can cause an interruption in the operation of the wireless process control device.

SUMMARY

A process control device comprises an interface configured to communicate with other devices in a process control system, the process control device and the other devices cooperating to control a process, and the process control device operating (1) to send process control signals to the other devices and/or (2) to receive process control signals from the other devices. The process control device further comprises a primary power source, the primary power source configured to provide power to at least one component of the process control device, which component, if not powered, would result in disruption to the control of the process. The process control device still further comprises a terminal configured to electrically couple the process control device to an auxiliary power source such that the auxiliary power source provides sufficient power to the at least one component when the auxiliary power source is connected to the terminal such that the process control device remains operable to control the process in the absence of the primary power source.

In another embodiment, an auxiliary power module comprises a connector configured to be coupled to an auxiliary power terminal of a process control device performing process control operations in a process plant. The auxiliary power module further comprises a power supply electrically coupled to the connector and configured to provide power, via the connector, to the process control device when the auxiliary power module is coupled to the process control device, the power supply providing power to the process control device sufficient to (1) maintain operation of the process control device and (2) prevent disruption to the process plant, when a primary power source of the process control device is removed.

In yet another embodiment, a method of replacing a primary power source of a process control device performing process control operations in a process plant, without interrupting operation of the process control device or disrupting the operation of the process plant, comprises coupling to a terminal of the process control device an auxiliary power module configured to temporarily power the process control device. The method further comprises, while the auxiliary power module is coupled to the terminal of the process control device and providing power to the process control device, replacing a first primary power source installed in the process control device to power the process control device with a second primary power source, and, after installation of the second primary power source, uncoupling the auxiliary power module from the terminal of the process control device.

In still another embodiment, a system comprises an auxiliary power module and a process control device coupleable to the auxiliary power module. The process control device performs one or more process control operations in a process plant and comprises a primary power source, the primary power source configured to provide power to at least one component of the process control device performing the one or more process control operations. The process control device further comprises a terminal configured to electrically couple the process control device to the auxiliary power module such that the auxiliary power module provides sufficient power to the component when the auxiliary power module is coupled to the terminal such that when the primary power source is removed temporarily and replaced, the process control device remains operable to perform the one or more process control operations in the absence of the primary power source.

BRIEF DESCRIPTION OF THE DRAWINGS

FIGS. 10A, 10B, and 10C illustrate a rotatable locking mechanism that can lock a primary power source and/or an auxiliary power source into a process control device.

DETAILED DESCRIPTION

The present disclosure is directed to replacing a primary power source of a process control device in a process control system. Specifically, the present disclosure is directed to a method and apparatus to replace a primary power source of a process control device without disrupting the operation of the process control device and without disrupting a corresponding process. In particular, an auxiliary power module may power the process control device to perform one or more process control functions, including, for example, sending and receiving data, in place of a primary power source of the process control device. An operator may connect the auxiliary power module to the process control device to temporarily power the process control device while the primary power source is replaced, removed, or otherwise taken out of operation.

While primarily directed to replacing batteries of a wireless process control device powered solely by the batteries, the techniques of the present disclosure may be utilized, in other implementations, to replace power sources of any other suitable process control devices, including process control devices having one or more wired connections. For example, an auxiliary power module may power a wired process control device, without disrupting a process, while a faulty wired connection to a power source (e.g., mains power) or the power source itself is replaced or modified.

Figure 1:
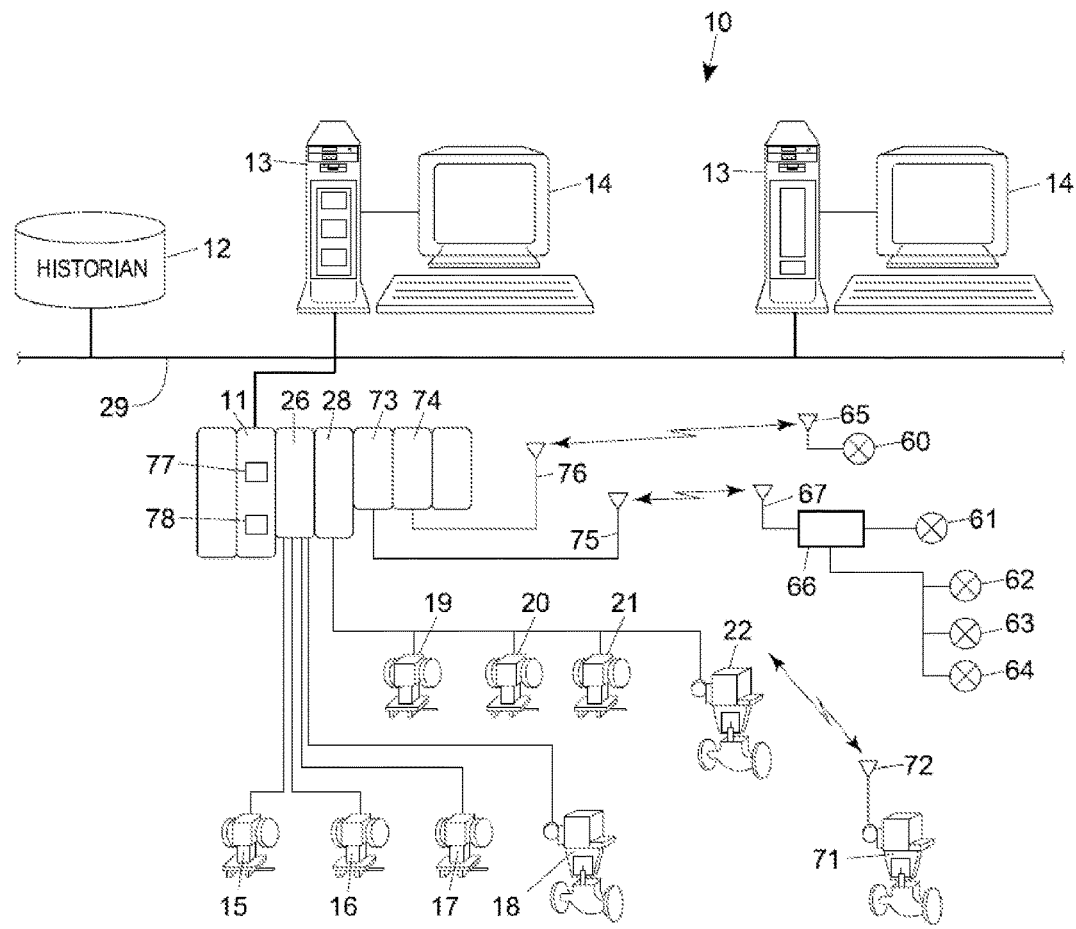
FIG. 1 illustrates an example process control system including process control devices operating with primary power sources that need to be occasionally replaced.

Referring now to FIG. 1, a process control system 10 constructed in accordance with one version of the present disclosure is depicted incorporating one or more field devices 15, 16, 17, 18, 19, 20, 21, 22, and 71 in communication with a process controller 11, which in turn, is in communication with a data historian 12 and one or more user workstations 13, each having a display screen 14. So configured, the controller 11 delivers signals to and receives signals from the field devices 15, 16, 17, 18, 19, 20, 21, 22, and 71 and the workstations 13 to control the process control system.

In additional detail, the process controller 11 of the process control system 10 of the version depicted in FIG. 1 is connected via hardwired communication connections to field devices 15, 16, 17, 18, 19, 20, 21, and 22 via input/output (I/O) cards 26 and 28. The data historian 12 may be any desired type of data collection unit having any desired type of memory and any desired or known software, hardware or firmware for storing data. Moreover, while the data historian 12 is illustrated as a separate device in FIG. 1, it may instead or in addition be part of one of the workstations 13 or another computer device, such as a server. The controller 11, which may be, by way of example, a DeltaV™ controller sold by Emerson Process Management, is communicatively connected to the workstations 13 and to the data historian 12 via a communication network 29 which may be, for example, an Ethernet connection.

As mentioned, the controller 11 is illustrated as being communicatively connected to the field devices 15, 16, 17, 18, 19, 20, 21, and 22 using a hardwired communication scheme which may include the use of any desired hardware, software, and/or firmware to implement hardwired communications. The hardwired communications may include, for example, standard 4-20 mA communications, and/or any communications using any smart communication protocol such as the FOUNDATION® Fieldbus communication protocol, the HART® communication protocol, etc. The field devices 15, 16, 17, 18, 19, 20, 21, and 22 may be any types of devices, such as sensors, pressure regulators, control valve assemblies, transmitters, positioners, etc., while the I/O cards 26 and 28 may be any types of I/O devices conforming to any desired communication or controller protocol. In the embodiment illustrated in FIG. 1, the field devices 15, 16, 17, and 18 are standard 4-20 mA devices that communicate over analog lines to the I/O card 26, while the digital field devices 19, 20, 21, and 22 can be smart devices, such as HART® communicating devices and Fieldbus field devices, that communicate over a digital bus to the I/O card 28 using Fieldbus protocol communications. Of course, the field devices 15, 16, 17, 18, 19, 20, 21, and 22 may conform to any other desired standard(s) or protocols, including any standards or protocols developed in the future.

In addition, the process control system 10 depicted in FIG. 1 includes a number of wireless field devices 60 and 71 and a number of other field devices 61, 62, 63, and 64 communicatively connected to a wireless router or other module 66 via one or more wired connections. The field devices 60, 61, 62, 63, and 64 are depicted as transmitters (e.g., process variable sensors) while the field device 71 is depicted as a control valve assembly including, for example, a control valve and an actuator. Wireless communications may be established between the controller 11 and the field devices 60, 61, 62, 63, 64, and 71 using any desired wireless communication equipment, including hardware, software, firmware, or any combination thereof now known or later developed. In the version illustrated in FIG. 1, an antenna 65 is coupled to and is dedicated to perform wireless communications for the transmitter 60, while a wireless router or other module 66 having an antenna 67 is coupled to collectively handle wireless communications for the transmitters 61, 62, 63, and 64. Likewise, an antenna 72 is coupled to the control valve assembly 71 to perform wireless communications for the control valve assembly 71. The field devices or associated hardware 60, 61, 62, 63, 64, 66, and 71 may implement protocol stack operations used by an appropriate wireless communication protocol to receive, decode, route, encode, and send wireless signals via the antennas 65, 67, and 72 to implement wireless communications between the process controller 11 and the transmitters 60, 61, 62, 63, and 64 and the control valve assembly 71.

If desired, the transmitters 60, 61, 62, 63, and 64 can constitute the sole link between various process sensors (transmitters) and the process controller 11 and, as such, are relied upon to send accurate signals to the controller 11 to ensure that process performance is not compromised. The transmitters 60, 61, 62, 63, and 64, often referred to as process variable transmitters (PVTs), therefore may play a significant role in the control of the overall control process. Additionally, the control valve assembly 71 may provide measurements made by sensors within the control valve assembly 71 or may provide other data generated by or computed by the control valve assembly 71 to the controller 11 as part of its operation. Of course, as is known, the control valve assembly 71 may also receive control signals from the controller 11 to effect physical parameters, e.g., flow, within the overall process.

The process controller 11 is coupled to one or more I/O devices 73 and 74, each connected to a respective antenna 75 and 76, and these I/O devices and antennas 73, 74, 75, and 76 operate as transmitters/receivers to perform wireless communications with the wireless field devices 61, 62, 63, 64, and 71 via one or more wireless communication networks. The wireless communications between the field devices (e.g., the transmitters 60, 61, 62, 63, and 64, and the control valve assembly 71) may be performed using one or more known wireless communication protocols, such as the WirelessHART® protocol, the Ember protocol, a WiFi protocol, an IEEE wireless standard, etc. Still further, the I/O devices 73 and 74 may implement protocol stack operations used by these communication protocols to receive, decode, route, encode, and send wireless signals via the antennas 75 and 76 to implement wireless communications between the controller 11 and the transmitters 60, 61, 62, 63, and 64, and the control valve assembly 71.

As illustrated in FIG. 1, the controller 11 conventionally includes a processor 77 that implements or oversees one or more process control routines (or any module, block, or sub-routine thereof) stored in a memory 78. The process control routines stored in the memory 78 may include or be associated with control loops being implemented within the process plant. Generally speaking, and as is generally known, the process controller 11 executes one or more control routines and communicates with the field devices 15, 16, 17, 18, 19, 20, 21, 22, 60, 61, 62, 63, 64, and 71, the user workstations 13 and the data historian 12 to control a process in any desired manner(s).

Additionally, any one of the field devices 15, 16, 17, 18, 19, 20, 21, 22, 60, 61, 62, 63, 64, and 71 in FIG. 1 and/or other types of field devices utilized by a process plant, may include one or more auxiliary power terminals in accordance with the principles of the present disclosure. The auxiliary power terminals, which may be disposed on the outside or inside of housings of the field devices 17, 18, 19, 20, 21, 22, 60, 61, 62, 63, 64, and 71, allow an auxiliary power module to temporarily power a respective one of the field devices 17, 18, 19, 20, 21, 22, 60, 61, 62, 63, 64, and 71 when a primary power source is removed, is being replaced, or is otherwise taken out of service.

In particular, one or more of the field devices 17, 18, 19, 20, 21, 22, 60, 61, 62, 63, 64, and 71 may operate wholly or partly on battery power. That is, a primary power source of at least some of the field devices 17, 18, 19, 20, 21, 22, 60, 61, 62, 63, 64, and 71 may include one or more batteries, which batteries need to be occasionally replaced. When the batteries wholly or partly powering one of the field devices 17, 18, 19, 20, 21, 22, 60, 61, 62, 63, 64, and 71 need to be replaced, an auxiliary power module, as discussed further below, may be coupled to the field device 17, 18, 19, 20, 21, 22, 60, 61, 62, 63, 64, and 71 to temporarily power the field device 17, 18, 19, 20, 21, 22, 60, 61, 62, 63, 64, and 71 while the batteries are replaced. In this manner, the operation of the one of the field devices 17, 18, 19, 20, 21, 22, 60, 61, 62, 63, 64, and 71 to control a process and the process itself is not disrupted due to a replacement of the primary power source.

In the following description, certain example devices and scenarios emphasize wireless process control devices, such as the field device 71, and, in particular, valve positioners. However, auxiliary power modules may be utilized to temporarily power any suitable types of wired and/or wireless process control devices, which process control devices integrate internal or external auxiliary power terminals to which the auxiliary power modules may be coupled. For example, auxiliary power modules may temporarily power hardwired field devices, such as the field devices 15, 16, 17, 18, 19, 20, 21, and 22, controllers, workstations, and/or transmitters (e.g., process variable sensors), such as the field devices 60, 61, 62, 63, and 64. In fact, auxiliary power modules may temporarily power components of a process control system other than "field devices," workstations, and controllers. For example, certain interconnections between components of the process control system 10, such as switches, hubs, firewalls, input/output (I/O) cards or gateways, etc., may be wholly or partly powered by batteries, and, thus, may be temporarily powered by an auxiliary power module while batteries are replaced.

Figure 2:
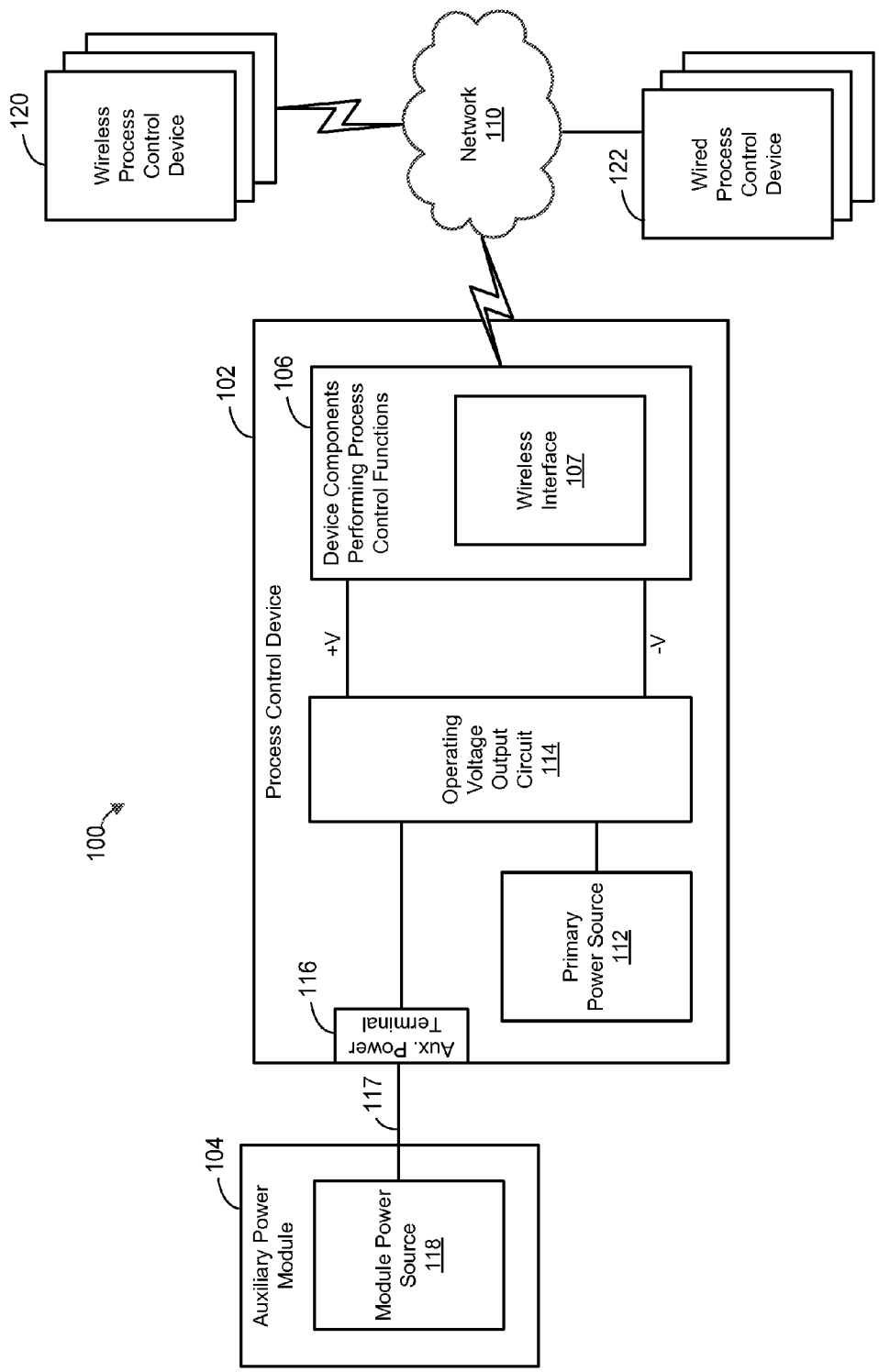
FIG. 2 illustrates an example process control device coupled to an auxiliary power module that may temporarily power the process control device.

Referring now to FIG. 2, an example system 100 includes a process control device 102 and an auxiliary power module 104. The process control device 102 may include one or more device components 106 to perform one or more process control operations or functions, such as controlling the position of a valve, transmitting temperature or pressure values, regulating a pressure at an outlet, etc. By way of example, the device components may include, processors (or microprocessors), non-transitory memories, application-specific integrated circuits (ASICs), field-programmable gate arrays (FPGAs), wired and/or wireless interface circuitry, and/or sensors (e.g., pressure, temperature, level, or flow sensors). By way of example, the process control device 102 may be a digital valve controller that controls a pressure, a valve position, and/or or a flow using the device components 106 of the process control device 102. The process control device 102 may receive setpoint values and/or other control signals, such as feedback signals, via a wired and/or wireless interface 107. Alternatively or additionally, the process control device 102 may receive control signals via one or more wired connections.

A wireless interface 107 of the process control device 102 may include any suitable combination of hardware and/or software components configured to send and receive process control related signals (e.g., setpoint values) and/or to send and receive process control related signals to/from others of the device components 106. By way of example, the wireless interface 107 may include radio transmitters, radio receivers, microprocessors, and/or antennas that allow the process control device to communicate (e.g., send and receive) information, such as numerical values, codes, data, messages, etc., with a network 110. The network 110 may include one or more local and or wide area networks, such as the Internet. In some implementations, the network 110 may include one or more wireless sensing networks utilizing standards or protocols specifically configured for wireless process control applications, such as the Wireless Highway Addressable Remote Transducer (WirelessHART®) protocol. The process control device 102 may also communicate with one or more other wireless process control devices 120 and/or one or more other wired process control devices 122 via the network 110.

The process control device 102 including the device components 106 may be powered, at least partially, by a primary power source 112. The primary power source 112 may include one or more non-rechargeable batteries or rechargeable batteries that allow the process control device 102 to operate, at least partially, without a wired connection from mains power providing power to the process control device 102. In some cases, the primary power source 112 itself may provide operating voltages for other circuits or components, such as the device components 106. However, in other cases, the primary power source 112 may be operatively connected, via one or more wires, to an operating voltage output circuit 114 to provide operating voltages for the device components 106. The operating voltage output circuit 114 may transform a power signal (e.g., 24V) to particular voltages (e.g., ±3.3V, ±10V) that are, in turn, applied to the rails of the device components 106. The positive and negative voltages are denoted in FIG. 1 as +V and −V, respectively, but it is understood that a positive voltage may be applied to one of the rails of the device components 106 and the other of the rails may be grounded.

In some implementations in which the primary power source 112 includes one or more batteries, the power source 112 may occasionally need to be replaced or recharged. To power the process control device 102 (e.g., including a wireless interface) while the power source 112 is replaced, the process control device 102 may be coupled to the auxiliary power module 104 via an auxiliary power terminal 116. A coupling 117 between the auxiliary power module 104 and the auxiliary power terminal 116 may include one or more wires, clips, connectors, etc. that couple to one or more jacks, ports, clips, etc. of the auxiliary power terminal 116. Further, the auxiliary power terminal 116 may include one or more locking mechanisms (not shown) to ensure that the auxiliary power module 104 is coupled to the process control device 102 before the primary power source 112 is removed, and vice versa. Such locking mechanisms are discussed further with reference to FIGS. 6A, 6B, 7A, 7B, 8, 9, 10A, 10B, and 10C.

The auxiliary power module 104 may include (e.g., within a portable housing of the auxiliary power module 104) a module power source 118. In some cases, the module power source 118 may include one or more batteries substantially the same as batteries in the primary power source 112, such as lithium batteries, gel batteries, absorbent glass mat (AGM) batteries, valve-regulated lead-acid (VRLA) batteries, etc. In other cases, the module power source 118 may include components to supply and/or generate power that are different from components of the primary power source 112. For example, the module power source 118 may be connected (e.g., via one or more electronic leads) to mains power or to a power source of another process control device, and/or the module power source 118 may include or be connected to one or more fuel cells, capacitors, solar panels, electric generators (e.g., pneumatic electric generators), etc. In one embodiment, the module power source 118 may include one or more batteries which may be recharged by solar cells or pneumatic electric generators coupled to the module power source 118. Although illustrated as including one module power source 118, the auxiliary power module 104 may include any number (two, three, four, etc.) and combination of batteries, fuel cells, wired connections to mains power or other process control devices, capacitors, solar panels, generators (e.g., pneumatic to electric), etc.

When coupled to the auxiliary power terminal 116, the module power source 118 may power the device components 106, a wireless interface of the process control device 102, and other components of the process control device 102. The module power source may, in an implementation, provide a power signal to the operating voltage output circuit 114 similar to that provided by the primary power source (e.g., 24V). To this end, the auxiliary power terminal 116 may connect the module power source 118 in parallel with the primary power source 112 via one or more power rails of the process control device. The module power source 118 and the primary power source 112 may power the device components 106 without interruption (e.g., without loss of power to the device components 106) when one or the other (but not both) of the module power source 118 and the primary power source 112 is removed from the process control device 102.

Figure 3:
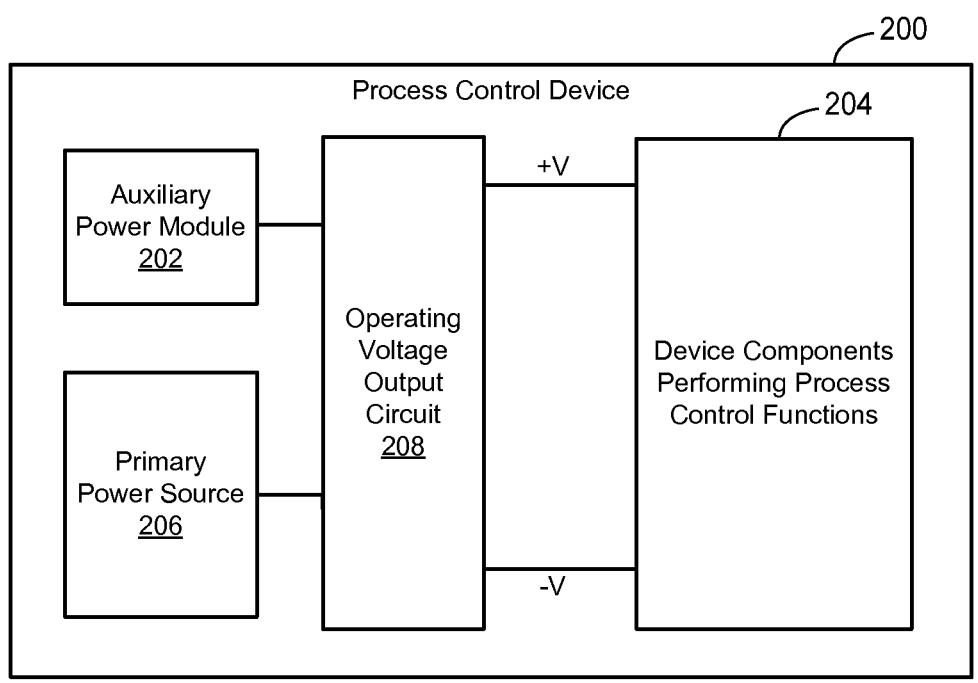
FIG. 3 is a block diagram of another example process control device integrating an auxiliary power module.

Although the auxiliary power module 104 is illustrated in FIG. 2 as separate from the process control device 102 (e.g., in a separate housing), auxiliary power modules may, in some cases, be integrated into process control devices. FIG. 3 is a block diagram of another example process control device 200 which integrates an auxiliary power module 202. By way of example, the process control device 200 may implement one or more process control functions via one or more device components 204, and the auxiliary power module 202 may be housed in the same housing as the device components 204.

A primary power source 206 operatively connected to an operating voltage output circuit 208 may primarily power the device components including a wireless interface 210. However, when the stored power in a battery of the primary power source 206 drops below a certain level and/or when the primary power source 206 malfunctions, the process control device 200 may activate the auxiliary power source 202 to power the device components 204. Such an activation may be triggered by a detection (e.g., via one or more sensors) of batteries levels in the primary power source 206, a manual "flipping" of a switch or other analog electrical and/or mechanical component by an operator, errors detected by control logic implemented in software executing on the process control device 200, control signals wirelessly received via the wireless interface 210, etc. When the primary power source 206 is replaced, or otherwise replenished, the process control device 200 may again utilize the primary power source 206 to power the device components 204.

Figure 4:
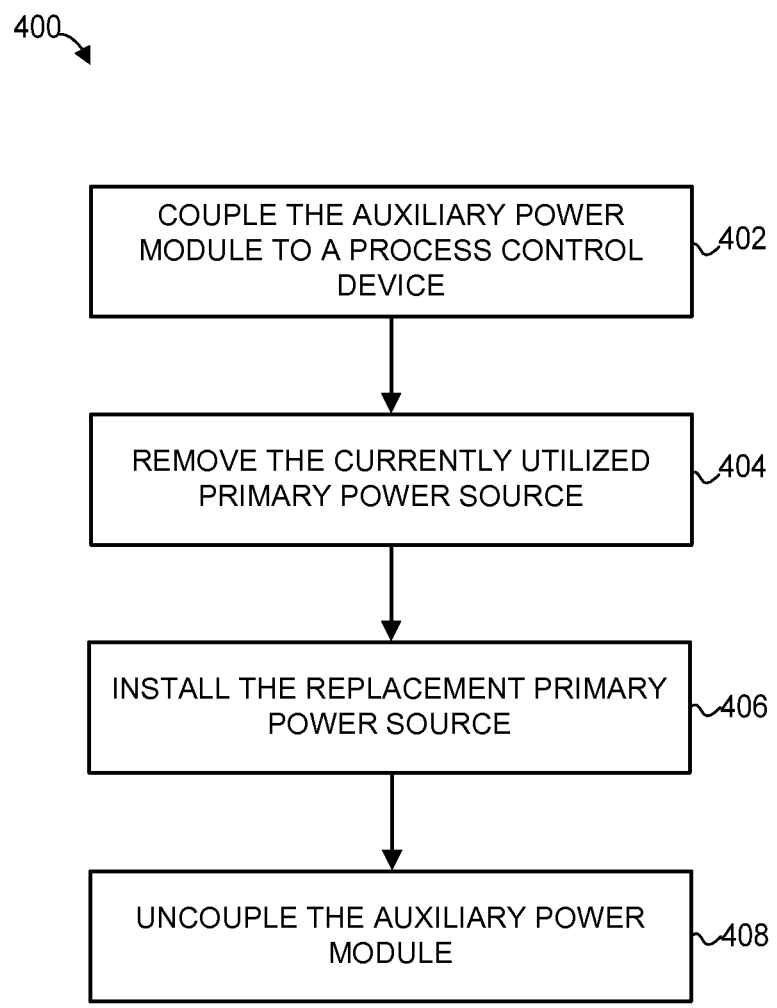
FIG. 4 is a flow diagram of an example method for replacing a power source of a process control device which can be implemented in the example process control system illustrated in FIG. 1.
Figure 5:
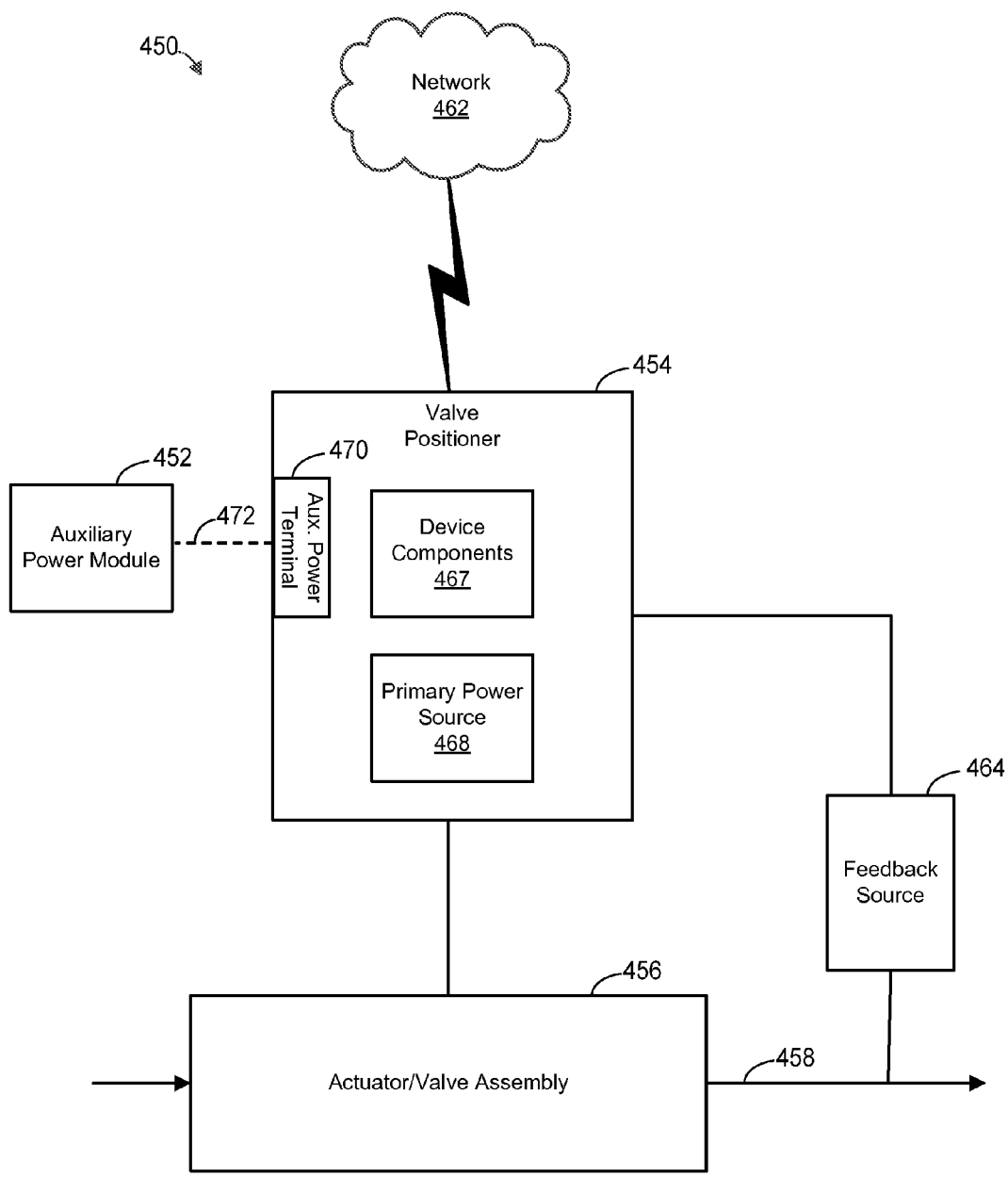
FIG. 5 illustrates an example scenario in which an auxiliary power module temporarily powers a valve positioner.

FIG. 4 is a flow diagram depicting an example method 400 for replacing a power source of a process control device without interrupting operation of the process control device and/or without communication between the process control device and another device. The method 400 may be implemented in the system 100, for example. By way of example, FIG. 5, which depicts an example scenario 450 involving a valve positioner 454, will be referred to in the description of the method 400. The valve positioner 454 is operatively connected (e.g., via one or more pneumatic connections) to an actuator/valve assembly 456 to control a flow or pressure at an output 458 of the actuator/valve assembly 456. The valve positioner 454 may control this flow or pressure based on setpoint values wirelessly received from a controller via a network 462 and based on feedback values received from a feedback source 464 via one or more wired or wireless connections. Generally, however, the method 400 may be utilized to replace the power source of any suitable wired or wireless field devices or other components of a process control system, such as any one of the field devices 17, 18, 19, 20, 21, 22, 60, 61, 62, 63, 64, and 71 of the process control system 10.

A primary power source 468 of the valve positioner 454 may primarily power the valve positioner 454 (e.g., may be a "primary power source" of the valve positioner 454) to control the actuator/valve assembly 456 via one or more device components 467. However, in certain cases, the primary power source 468 may need to be replaced (e.g., in the case of a non-rechargeable battery). As such, the valve positioner 454 may wirelessly communicate signals to one or more computing devices, such as a controller, via the network 462, which signals indicate battery levels below/above a threshold, absolute battery levels, abnormal behavior of the primary power source 468, device errors related to the primary power source 468, etc. In response, operators of the recipient computing devices may initiate or schedule a replacement of the primary power source 468 according to the example method 400.

In the method 400, an auxiliary power module is coupled to a process control device (block 402). For example, the auxiliary power module 452 may be connected via a coupling 472 (e.g., one or more power cables) to the valve positioner 454. In some cases, such as connection may unlock the primary power source 468 of the process control device 454. Further, when connected to the valve positioner 454, the auxiliary power module 452 may power the valve positioner 454, including the device components 467.

The primary power source (e.g., the primary power source 468) of the process control device is removed from the process control device while the auxiliary power module is connected (block 404). When the primary power source 468 of the valve positioner 454 is a battery that is being replaced, an operator may remove the battery from one or more battery compartments, holders, terminals, etc. of the valve positioner 454.

A new primary power source is installed in place of the removed primary power source while the auxiliary power module is connected (block 406). In the scenario 450, an operator may replace one or more batteries of the primary power source 468 with batteries that are near identical to the removed batteries. However, in other implementations, process control devices may be powered by a variety of primary power sources. In such implementations, one type of power source, such as a solar panel and attached battery, may be replaced with another types of power source, such as a non-rechargeable battery. Further, the new primary power source replacing the removed primary power source may be a recharged or replenished version of the first primary power source. That is, a primary power source may be removed from a process control device, recharged, and re-installed in the wireless process control device.

Returning to FIG. 4, the auxiliary power module is uncoupled from the wireless process control device (block 408). An operator may remove the coupling 472 (e.g., one or more cables) from the auxiliary power terminal 470, and, in some cases, may lock the replacement primary power source in place.

While the primary power source 468 of the valve positioner 454 is replaced according to the example method 400, the device components 467 of the valve positioner 454 continue to operate to control the flow or pressure at an output 458 of the actuator/valve assembly 456. Further, while the primary power source 468 of the valve positioner 454 is replaced, the valve positioner 454 may continue to receive control signals (e.g., setpoint values from a controller) from the network 462 and/or feedback signals (e.g., pressure values) from the feedback source 464 (e.g., a pressure transducer). Thus, the operation of the valve positioner 454 and the process being controlled by a process control system integrating the valve positioner 454 is not disrupted during the replacement of the primary power source 468.

As mentioned with reference to FIG. 2, auxiliary power terminals or other connections of process control devices to auxiliary power modules may include one or more locking mechanisms. These locking mechanisms may ensure that: (i) auxiliary power modules are operatively connected to corresponding process control devices before primary power sources are removed or otherwise taken out of operation; and/or (ii) primary power sources are replaced or in operation before auxiliary power modules are disconnected from corresponding process control devices. FIGS. 6A, 6B, 7A, 7B, 8, 9, 10A, 10B, and 10C illustrate example locking mechanisms. However, any combination of the example locking mechanisms illustrated in FIGS. 6A, 6B, 7A, 7B, 8, 9, 10A, 10B, and 10C along with other suitable electrical and/or mechanical locking mechanisms, such as mechanical locks and keys, analog switches, biometric sensors, etc., may be utilized to lock primary power sources and/or auxiliary power sources into process control devices. Further, although not shown in FIGS. 6A, 6B, 7A, 7B, 8, 9, 10A, 10B, and 10C for ease of discussion, auxiliary power terminals may include any number of electrical connections, power conditioning components, etc. to allow a voltage or current signal from an auxiliary power module to be provided to various components of a process control device.

Figure 6A:
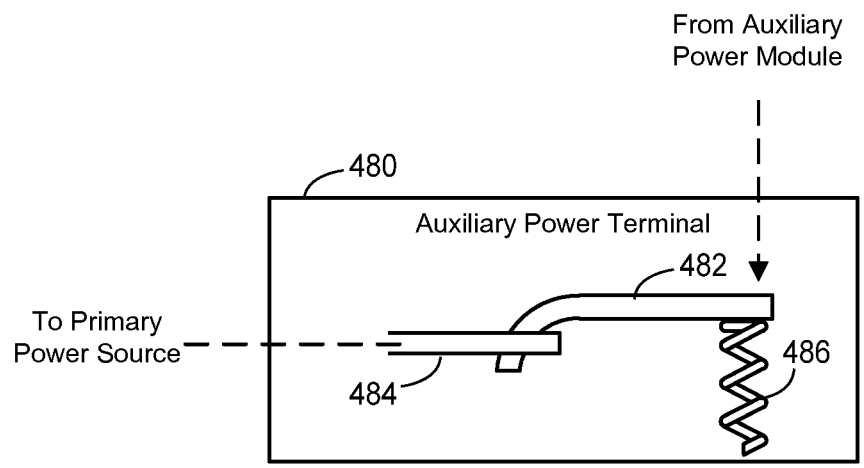
FIGS. 6A and 6B illustrate an example mechanical locking mechanism that can lock a primary power source and/or an auxiliary power source into a process control device.
Figure 6B:
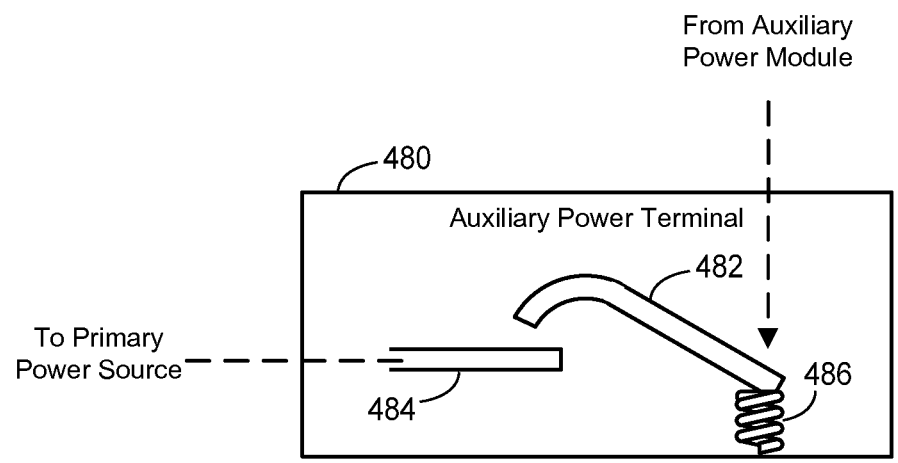

FIGS. 6A and 6B illustrate an example auxiliary power terminal 480 which includes a mechanical mechanism for locking a primary power source into a process control device based on a presence of a connection to an auxiliary power module. The auxiliary power terminal 480 may include one or more levers 482 that rotate or otherwise move (as illustrated in FIG. 6B) upon the insertion of a connection from an auxiliary power module into the auxiliary power terminal 480. In particular, the levers 482 may move to release one or more rings 404 or bars which lock a primary or primary power source (e.g., a battery) in place and/or prevent operators from accessing the primary power source.

When an operator inserts an end of a connector (e.g., power cable) into the auxiliary power terminal 480, the force from the insertion of the connector may compress one or more springs 486, which springs keep the lever 402 from releasing the ring 484. When the connector is removed, the springs 486 may return the lever 402 to a near equilibrium position locking the ring 484 in place.

Although not shown in FIGS. 6A and 6B, the auxiliary power terminal 480 may include a similar or dissimilar locking mechanism to lock a connector from an auxiliary power module into the auxiliary power terminal 480 in the absence of a primary or primary power source. For example, an operator may insert a connector from an auxiliary power module into the auxiliary power terminal 480 (unlocking a primary power source) and remove the primary power source of a corresponding process control device. When the primary power source is removed from the process control device, a locking mechanism may lock the attached connector from the auxiliary power module into the auxiliary power terminal 480. In this manner, a process control device may be powered without interruption during a replacement of a primary power source, such as a battery.

Figure 7A:
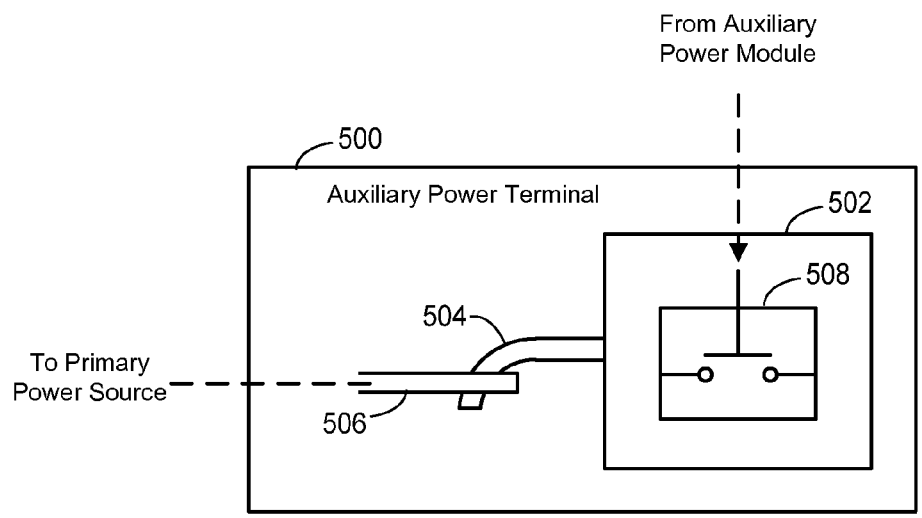
FIGS. 7A and 7B illustrate an example electromechanical locking mechanism that can lock a primary power source and/or an auxiliary power source into a process control device.
Figure 7B:
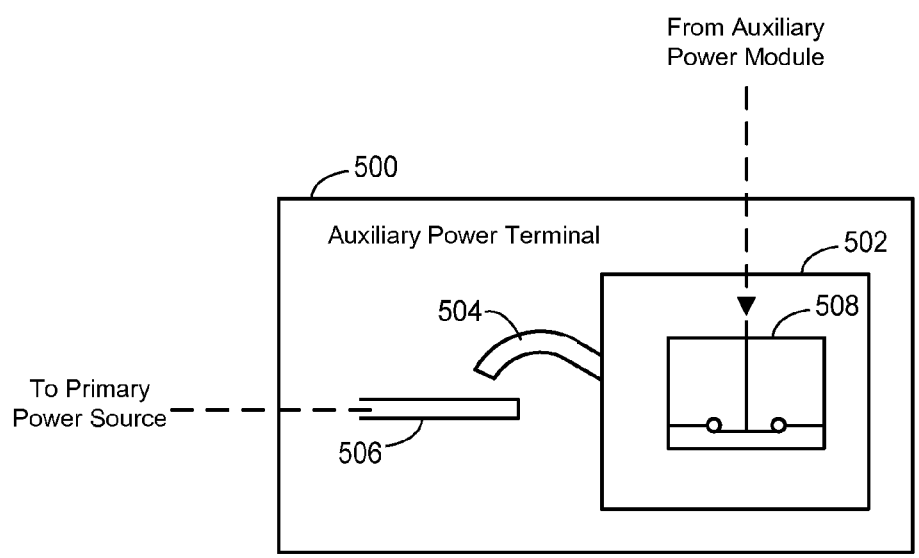

FIGS. 7A and 7B illustrates another example auxiliary power terminal 500 which includes an electromechanical mechanism 502 for locking a primary power source into a process control device. Similar to the auxiliary power terminal 480 illustrated in FIGS. 6A and 6B, the auxiliary power terminal 500 may include a lever 504 that locks a ring 506 or bar into place, which ring 506, when locked, prevents the removal of a primary power source or prevents access to a primary power source. However, in the implementation depicted in FIGS. 7A and 7B, the ring 506 may only be released from the lever 504 when an electrical connection 508 is completed.

In an example scenario, an operator may connect a cable from an auxiliary power module to the auxiliary power terminal 500. The force from connecting the cable of the auxiliary power module may close a switch completing the electrical connection 508. Once the electrical connection 508 is completed, one or more components of the electromechanical mechanism 502 may move the lever 504 releasing the ring 506 and freeing a corresponding primary power source, such as a battery, as illustrated in FIG. 7B. In some implementations, one or more springs or other components of the electromechanical mechanism 502 may also short the electrical connection 508 when the auxiliary power module is disconnected from the auxiliary power terminal 500.

In some embodiments, the electrical components of the electromechanical mechanism 502 (e.g., the circuit including the electrical connection 508) may be powered by a primary power source, which primary power source powers other components of a process control device in the absence of an auxiliary power module. In other embodiments, the electrical components of the electromechanical mechanisms 502 may be powered by any other suitable power sources integrated into a process control device, such as batteries or capacitors specifically configured to power the electromechanical mechanism 502.

Figure 8:
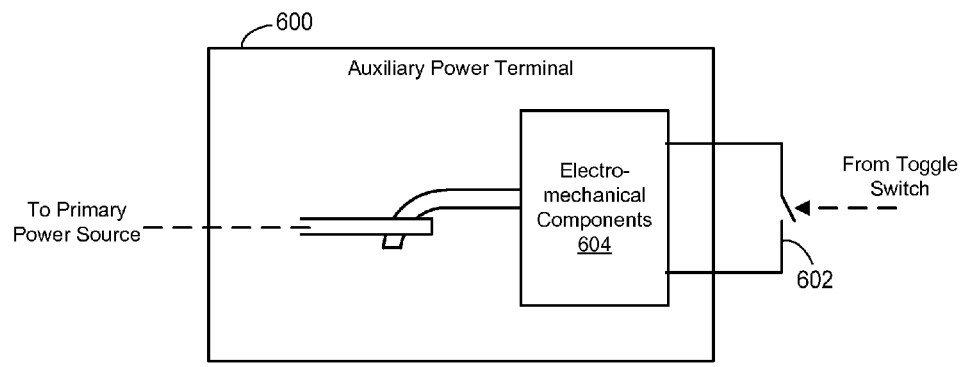
FIG. 8 illustrates another example electromechanical locking mechanism that can lock a primary power source and/or an auxiliary power source into a wireless process control device.
Figure 9:
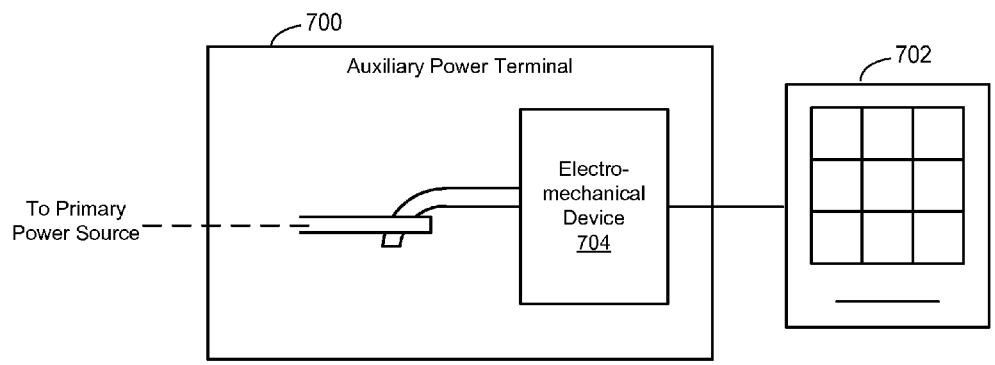
FIG. 9 illustrates yet another example electromechanical locking mechanism that can lock a primary power source and/or an auxiliary power source into a process control device.

Although the example auxiliary power terminals 480 and 500 utilize particular locking mechanisms that are mechanically or electrically actuated, auxiliary power terminals may generally utilize any suitable electronic signal, electronic connection, magnetic connection, or mechanical action to lock/unlock primary power sources. In particular, FIG. 8 illustrates another example auxiliary power terminal 600 in which an operator may flip a toggle switch to complete an electrical connection 602. Upon completing the electrical connection 604, one or more one or more electromechanical components 602 release a primary power source. FIG. 9 illustrates yet another example auxiliary power terminal 700 in which an operator may enter a certain sequence of numbers, letters, or other characters on and/or insert a key card into a keypad 702. Upon receiving electrical signals from the keypad 702 indicative of the key card or sequence, one or more electromechanical components 704 may release a primary power source, such as a battery.

In yet another embodiment, a coupling 1000 of an auxiliary power module and a corresponding auxiliary power terminal 1002 may include one or more rotatable locking mechanisms, as illustrated in FIGS. 10A, 10B, and 10C. The coupling 1000 may be part of a cable or other interconnection between an auxiliary power module, such as one of the auxiliary power modules 104, 202, or 452, and the auxiliary power terminal 1002 of a process control device. The coupling 1000 may include a male end 1006 of a power connection from a module power source of a corresponding auxiliary power module surrounded by a rotatable locking mechanism 1004.

The rotatable locking mechanism 1004 of the coupling 1000 may be include one or more channels 1008, and the auxiliary power terminal 1002 may include one or more locking tabs 1010. When the male end 1006 of the power connection is inserted into a female end 1012 of the auxiliary power terminal 1002 to temporarily power a corresponding process control device, the locking tabs 1010 may travel into the channels 1008. An operator may then rotate the coupling 1000 such that the locking tabs 1010 are disposed under a lip 1014 of the rotatable locking mechanism 1004 so as to lock the coupling 1000 in place.

In some implementations, auxiliary power terminals of process control devices may utilize electrical and/or mechanical connections and locking mechanisms, as further discussed above, to adhere to safety requirements of a device (e.g., intrinsic safety requirements). For example to prevent an electrical discharge, the auxiliary power terminal 600 may not provide voltages or currents from an auxiliary power module to components of a corresponding process control device unless the electrical connection 602 is completed (e.g., via a toggle switch). In one scenario: (i) an operator may connect a cable from an auxiliary power module to the auxiliary power terminal 600 integrated in a process control device; (ii) the operator may flip a toggle switch completing the electrical connection 602; and (iii) when the electrical connection 602 is completed, the electromechanical components 604 may release a battery from the process control device and provide power to components of the process control device from the auxiliary power module. In this manner, the risk of an electrical spark may be substantially minimized. In some implementations, auxiliary power modules, such as the auxiliary power modules 104, 202, and 452, may also be configured such that components of the auxiliary power modules store an amount of energy less than a threshold specified by an intrinsic safety standard.

Although illustrated as part of respective process control devices, auxiliary power terminals, such as the auxiliary power terminals 116, 470, 480, 500, 600, and 700, may be separate from process control devices and/or auxiliary power units. For example, auxiliary power terminals may be disposed in housing separate from housing of process control devices and auxiliary power modules. In such cases, operators may couple process control devices and auxiliary power modules via one or more connections to a separate auxiliary power terminal. In other embodiments, some or all of the components of auxiliary power terminals, such as locking mechanisms may be integrated into auxiliary power modules.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The following aspects represent examples of embodiments of the presently described methods and systems. This list of aspects is intended to be non-limiting, as other embodiments are clearly contemplated in view of the present description.

1. A process control device comprising:
an interface configured to communicate with other devices in a process control system, the process control device and the other devices cooperating to control a process, and the process control device operating (1) to send process control signals to the other devices and/or (2) to receive process control signals from the other devices;
a primary power source, the primary power source configured to provide power to at least one component of the process control device, which component, if not powered, would result in disruption to the control of the process; and
a terminal configured to electrically couple the process control device to an auxiliary power source such that the auxiliary power source provides sufficient power to the at least one component when the auxiliary power source is connected to the terminal such that the process control device remains operable to control the process in the absence of the primary power source.

2. The process control device according to aspect 1, further comprising a locking mechanism configured to prevent the primary power source from being removed from the process control device when the auxiliary power source is not connected to the terminal.

3. The process control device according to aspect 2, wherein the locking mechanism is configured to prevent the primary source from being removed from the process control device when the device is not receiving sufficient power from the auxiliary power source.

4. The process control device according to aspect 2, wherein the locking mechanism is actuated, electrically or mechanically, by connection of the auxiliary power source to the terminal.

5. The process control device according to aspect 2, wherein the locking mechanism is configured to maintain the connection between the terminal and the auxiliary power source when the primary power source is uncoupled from the process control device.

6. The process control device according to any one of the preceding aspects, wherein the process control device controls a valve based on the process control signals, and wherein, when the auxiliary power source is electrically coupled to the terminal and the primary power source is removed, the auxiliary power source powers the process control device to control a position of the valve.

7. The process control device according to any one of the preceding aspects, further comprising a wireless interface device configured to:
receive power from the primary power source,
receive power from the auxiliary power source when the auxiliary power source is coupled to the process control device via the terminal, and
to maintain a communication connection with one or more of the other devices when receiving power from the auxiliary power source.

8. The process control device according to any one of the preceding aspects, wherein the primary power source is a rechargeable battery.

9. The process control device according to any one of the preceding aspects, wherein the primary power source is a non-rechargeable battery.

10. The process control device according to any one of the preceding aspects, wherein the primary power source is a rechargeable battery.

11. The process control device according to any one of the preceding aspects, wherein the auxiliary power source is portable and wherein primary power source includes a wired connection to a stationary power source.

9. The process control device according to any one of the preceding aspects, wherein the auxiliary power source is wholly contained within the process control device.

10. The process control device according to any one of the preceding aspects, wherein the auxiliary power source is a portable power source.

11. The process control device according to any one of the preceding aspects, wherein the auxiliary power source is a capacitor.

12. The process control device according to either aspect 10 or aspect 11, wherein the auxiliary power source comprises a solar cell to keep the auxiliary power source charged.

13. The process control device according to either aspect 10 or aspect 11, wherein the auxiliary power source comprises a generator coupled to a pneumatic supply, the generator recharging the auxiliary power source.

14. The process control device of any one of aspects 1 to 10, wherein the auxiliary power source is a battery.

15. The process control device according to any one of the preceding aspects, wherein the at least one component of the process control device comprises a processor, an ASIC, or an FPGA.

16. An auxiliary power module comprising:
a connector configured to be coupled to an auxiliary power terminal of a process control device performing process control operations in a process plant;
a power supply electrically coupled to the connector and configured to provide power, via the connector, to the process control device when the auxiliary power module is coupled to the process control device, the power supply providing power to the process control device sufficient to (1) maintain operation of the process control device and (2) prevent disruption to the process plant, when a primary power source of the process control device is removed.

17. The auxiliary power module according to aspect 16, wherein the power supply, when coupled to the connector, provides power to a wireless communication module of the process control device.

18. The auxiliary power module according to either aspect 16 or aspect 17, wherein the connector is configured to actuate a locking mechanism on the process control device.

19. The auxiliary power module according to aspect 18, wherein the connector is configured to actuate the locking mechanism to release a primary power source of the wireless process control device.

20. The auxiliary power module according to either aspect 18 or aspect 19, wherein the connector is configured to actuate the locking mechanism to lock the auxiliary power module in place while a primary power source of the wireless process control device is removed.

21. A method of replacing a primary power source of a process control device performing process control operations in a process plant, without interrupting operation of the process control device or disrupting the operation of the process plant, the method comprising:
coupling to a terminal of the process control device an auxiliary power module configured to temporarily power the process control device;
while the auxiliary power module is coupled to the terminal of the process control device and providing power to the process control device, replacing a first primary power source installed in the process control device to power the process control device with a second primary power source; and
after installation of the second primary power source, uncoupling the auxiliary power module from the terminal of the process control device.

22. The method according to aspect 21, wherein the process control device is a wireless process control device and wherein the wireless process control device maintains communication with another device in the process plant when the process control device is coupled to the auxiliary power source and both the first and second primary power sources are disconnected from the process control device.

23. The method according to either aspect 21 or aspect 22, further comprising, before replacing the first primary power source with the second primary power source, activating the auxiliary power module to temporarily power the process control device by engaging a switch of the process control device or by engaging a switch of the auxiliary power module.

24. The method according to aspect 21, wherein coupling the auxiliary power module to the terminal of the wireless process control device includes attaching a connector of the auxiliary power module to the terminal of the wireless process control device, and wherein a locking mechanism of the wireless process control device is disengaged by attaching the connector of the auxiliary power module to the terminal of the wireless process control device, the locking mechanism locking the first power source in the wireless process control device.

25. A system comprising:
an auxiliary power module; and a process control device coupleable to the auxiliary power module, the process control device performing one or more process control operations in a process plant and comprising:
  a primary power source, the primary power source configured to provide power to at least one component of the process control device performing the one or more process control operations; and
  a terminal configured to electrically couple the process control device to the auxiliary power module such that the auxiliary power module provides sufficient power to the component when the auxiliary power module is coupled to the terminal such that when the primary power source is removed temporarily and replaced, the process control device remains operable to perform the one or more process control operations in the absence of the primary power source.

26. The system according to aspect 25, wherein the process control device is a wireless process control device and wherein the wireless process control device maintains communication with another device in the process plant when the process control device is coupled to the auxiliary power source and in the absence of the primary power source.

27. The system according to either aspect 25 or aspect 26, wherein the process control device further comprises a locking mechanism configured to prevent the primary power source from being removed from the process control device when the auxiliary power source is not connected to the terminal.

28. The system according to aspect 27, wherein the locking mechanism is configured to prevent the primary power source from being removed from the process control device when the device is not receiving sufficient power from the auxiliary power source.

29. The system according to either aspect 27 or aspect 28, wherein the locking mechanism is configured to maintain the connection between the terminal and the auxiliary power source when the primary power source is uncoupled from the process control device.

What is claimed is:

1. A process control device comprising:
  an interface configured to communicate with other devices in a process control system, the process control device and the other devices cooperating to control a process, and the process control device operating (1) to send process control signals to the other devices and/or (2) to receive process control signals from the other devices;
  a primary power source, the primary power source configured to provide power to at least one component of the process control device, which component, if not powered, would result in disruption to the control of the process; and
  a terminal configured to electrically couple the process control device to an auxiliary power source such that the auxiliary power source provides sufficient power to the at least one component and actuates a locking mechanism when the auxiliary power source is connected to the terminal such that the process control device remains operable to control the process in the absence of the primary power source.

2. The process control device of claim 1, wherein the locking mechanism is configured to prevent the primary power source from being removed from the process control device when the auxiliary power source is not connected to the terminal.

3. The process control device of claim 1, wherein the locking mechanism is configured to prevent the primary source from being removed from the process control device when the device is not receiving sufficient power from the auxiliary power source.

4. The process control device of claim 1, wherein the locking mechanism is actuated electrically by connection of the auxiliary power source to the terminal.

5. The process control device of claim 1, wherein the locking mechanism is configured to maintain the connection between the terminal and the auxiliary power source when the primary power source is uncoupled from the process control device.

6. The process control device of claim 1, wherein the process control device controls a valve based on the process control signals, and wherein, when the auxiliary power source is electrically coupled to the terminal and the primary power source is removed, the auxiliary power source powers the process control device to control a position of the valve.

7. The process control device of claim 1, further comprising a wireless interface device configured to:
  receive power from the primary power source,
  receive power from the auxiliary power source when the auxiliary power source is coupled to the process control device via the terminal, and
  to maintain a communication connection with one or more of the other devices when receiving power from the auxiliary power source.

8. The process control device of claim 1, wherein the primary power source is a battery.

9. The process control device of claim 1, wherein the auxiliary power source is wholly contained within the process control device.

10. The process control device of claim 1, wherein the auxiliary power source is a portable power source.

11. The process control device of claim 1, wherein the auxiliary power source is a capacitor.

12. The process control device of claim 1, wherein the auxiliary power source comprises a solar cell to keep the auxiliary power source charged.

13. The process control device of claim 1, wherein the auxiliary power source comprises a generator coupled to a pneumatic supply, the generator recharging the auxiliary power source.

14. The process control device of claim 1, wherein the auxiliary power source is a battery.

15. The process control device of claim 1, wherein the at least one component of the process control device comprises a processor, an ASIC, or an FPGA.

16. An auxiliary power module comprising:
  a connector configured to be coupled to an auxiliary power terminal of a process control device performing process control operations in a process plant;
  a power supply electrically coupled to the connector and configured to provide power, via the connector, to the process control device when the auxiliary power module is coupled to the process control device, the power supply providing power to the process control device sufficient to (1) maintain operation of the process control device and (2) prevent disruption to the process plant, when a primary power source of the process control device is removed, wherein the auxiliary power module is configured such that the auxiliary power module actuates a locking mechanism in the process control device.

17. The auxiliary power module of claim 16, wherein the power supply, when coupled to the connector, provides power to a wireless communication module of the process control device.

18. The auxiliary power module of claim 16, wherein the connector is configured to actuate a locking mechanism on the process control device.

19. The auxiliary power module of claim 16, wherein the connector is configured to actuate the locking mechanism to release a primary power source of the wireless process control device.

20. The auxiliary power module of claim 16, wherein the connector is configured to actuate the locking mechanism to lock the auxiliary power module in place while a primary power source of the wireless process control device is removed.

21. A method of replacing a primary power source of a process control device performing process control operations in a process plant, without interrupting operation of the process control device or disrupting the operation of the process plant, the method comprising:
coupling to a terminal of the process control device an auxiliary power module configured to actuate a locking mechanism and temporarily power the process control device;
while the auxiliary power module is coupled to the terminal of the process control device and providing power to the process control device, replacing a first primary power source installed in the process control device to power the process control device with a second primary power source; and
after installation of the second primary power source, uncoupling the auxiliary power module from the terminal of the process control device.

22. The method of claim 21, wherein the process control device is a wireless process control device and wherein the wireless process control device maintains communication with another device in the process plant when the process control device is coupled to the auxiliary power source and both the first and second primary power sources are disconnected from the process control device.

23. The method of claim 21, further comprising, before replacing the first primary power source with the second primary power source, activating the auxiliary power module to temporarily power the process control device by engaging a switch of the process control device or by engaging a switch of the auxiliary power module.

24. The method of claim 21, wherein coupling the auxiliary power module to the terminal of the wireless process control device includes attaching a connector of the auxiliary power module to the terminal of the wireless process control device, and wherein the locking mechanism of the wireless process control device is disengaged by attaching the connector of the auxiliary power module to the terminal of the wireless process control device, the locking mechanism locking the first power source in the wireless process control device.

25. A system comprising:
an auxiliary power module; and
a process control device coupleable to the auxiliary power module, the process control device performing one or more process control operations in a process plant and comprising:
a primary power source, the primary power source configured to provide power to at least one component of the process control device performing the one or more process control operations; and
a terminal configured to electrically couple the process control device to the auxiliary power module such that the auxiliary power module provides sufficient power to the component and actuates a locking mechanism when the auxiliary power module is coupled to the terminal such that when the primary power source is removed temporarily and replaced, the process control device remains operable to perform the one or more process control operations in the absence of the primary power source.

26. The system of claim 25, wherein the process control device is a wireless process control device and wherein the wireless process control device maintains communication with another device in the process plant when the process control device is coupled to the auxiliary power source and in the absence of the primary power source.

27. The system of claim 25, wherein the locking mechanism is configured to prevent the primary power source from being removed from the process control device when the auxiliary power source is not connected to the terminal.

28. The system of claim 25, wherein the locking mechanism is configured to prevent the primary power source from being removed from the process control device when the device is not receiving sufficient power from the auxiliary power source.

29. The system of claim 25, wherein the locking mechanism is configured to maintain the connection between the terminal and the auxiliary power source when the primary power source is uncoupled from the process control device.

30. The process control device of claim 1, wherein the locking mechanism is actuated mechanically by connection of the auxiliary power source to the terminal.

31. The process control device of claim 1, wherein the locking mechanism is actuated electromechanically by connection of the auxiliary power source to the terminal.

* * * * *